United States Patent [19]
Ring et al.

[11] Patent Number: 5,794,739
[45] Date of Patent: Aug. 18, 1998

[54] PNEUMATIC PRESSURE OPERATED PARKING BRAKE FOR A RAILWAY VEHICLE BRAKE SYSTEM

[75] Inventors: Michael E. Ring, Crown Point, Ind.; Scott L. Natschke, Kankakee, Ill.; Michael G. Hawryszkow, Munster, Ind.

[73] Assignee: Westinghouse Air Brake Company, Wilmerding, Pa.

[21] Appl. No.: 664,391

[22] Filed: Jun. 14, 1996

[51] Int. Cl.$^6$ .................................................. F16D 65/56
[52] U.S. Cl. .................. 188/153 R; 188/52; 188/196 D; 188/265
[58] Field of Search ........................ 188/33, 49–55, 188/153 R, 265, 107, 106 F, 106 P, 196 D, 199, 202, 351, 196 A, 198–203; 303/13–18, 85, 86, 89, 87, 900, 33, 37, 10

[56] References Cited

U.S. PATENT DOCUMENTS

| | | | |
|---|---|---|---|
| 2,511,336 | 6/1950 | Hudson | 188/153 R |
| 3,550,731 | 12/1970 | Roselius et al. | 188/153 R |
| 3,893,544 | 7/1975 | Means | 188/153 R |
| 4,175,793 | 11/1979 | Quenten | 188/153 R |
| 4,467,605 | 8/1984 | Smith | 188/153 R |
| 4,662,485 | 5/1987 | Kanjo et al. | 188/196 D |
| 5,503,467 | 4/1996 | Gaughan | 303/38 |

Primary Examiner—Douglas C. Butler
Attorney, Agent, or Firm—James Ray & Associates

[57] ABSTRACT

Air pressure actuated and hydraulic applied railway car parking brake system includes air source to actuate. A control valve receives air from source to initiate air communication. Pneumatic to hydraulic pressure intensifier receives air in first chamber therein from valve. A second intensifier chamber is connected at open first end thereof with partially open second end of first chamber. Hydraulic fluid is disposed in second chamber adjacent closed second end thereof. A force transmitting cylinder, in fluid communication with second chamber, exerts force on brake beam carrying brake shoes thereon which are brought and maintained in frictional engagement with a respective surface of tread portion of a pair of wheels during system operation. A piston member, disposed for reciprocal movement in first chamber, is linearly displaced when a first surface thereof is acted on by air communicated to intensifier. A first seal, around peripheral portion of piston, contains air communicated to intensifier in portion of first chamber located between the first surface and first end of first chamber. A stem member, disposed to move linearly in first and second chambers, is connected at first end thereof to second surface of piston. Such stem is linearly displaced in first and second chambers by piston movement. A second seal, around peripheral second end portion of stem, retains hydraulic fluid in second chamber between second end of stem and second end of second chamber to communicate hydraulic fluid to force transmitting cylinder, by linear displacement, and exert force on beam carrying shoes.

14 Claims, 2 Drawing Sheets

PNEUMATIC PRESSURE OPERATED PARKING BRAKE FOR A RAILWAY VEHICLE BRAKE SYSTEM

CROSS REFERENCE TO RELATED APPLICATIONS

This application is related to two patent applications entitled RAILWAY VEHICLE BRAKE SYSTEM and A SLACK ADJUSTABLE FORCE TRANSMITTING CYLINDER, bearing U.S. Ser. Nos. 08/664,392 and 08/664, 389, respectively, filed concurrently herewith on Jun. 14, 1996. These concurrently filed applications have been allowed and are assigned to the assignee of the present invention. Their teachings are incorporated into this document by reference.

FIELD OF THE INVENTION

The present invention relates, in general, to various types of railway vehicle braking systems and, more particularly, the invention relates to an improved brake system for a railway type freight car and, still more particularly, the instant invention relates to a brake system having an improved parking brake type system for use on such railway type freight cars incorporated therein which possesses the capability of utilizing a combination of pneumatic and hydraulic pressure to enhance the performance of such parking brake system.

BACKGROUND OF THE INVENTION

Prior to the conception and subsequent development of the invention to be taught hereinafter, as is generally quite well known in the railroad industry, railway type freight cars are required to be equipped with a parking brake as a part of the necessary braking system disposed on such freight cars.

These prior art type parking brakes have to be set manually. As a result, these parking brakes are commonly known in the industry as hand brakes. Such parking brakes are set, at least, when the brake pipe air line disposed on such freight cars is not connected for fluid communication with the brake pipe air line which is a part of the air brake system disposed on a train consist. This would necessarily be the case, for example, when such freight car is either waiting to be connected into such a train consist or when such freight car has been removed from such a train consist.

The parking brakes being used in this application, for many years prior to the present invention, have all required that they be both manually applied and thereafter released by railroad personnel. Such manual application and subsequent release of these hand brakes has required these prior art type parking brakes to be equipped either with a rotatable hand wheel member or with a pump action type hand crank member.

Normally, either through the rotation of such hand wheel member, or by pumping on the hand crank member, the required amount of brake force can be generated and applied to the brake beam, and/or beams. Such brake beam carries the brake shoes thereon which are brought into frictionally engagement with at least a portion of the tread surface of the respective wheels disposed on the truck member portion of a freight car during a brake application.

Such required braking force is applied to these brake beams, and then to the brake shoes, through a chain that is connected at a first end thereof to a chain drum disposed in the hand brake secured to the freight car and then connected at a second end thereof to the brake beams, carrying such brake shoes, through a brake lever system. Such chain drum being rotated thorough the manual operation of the hand wheel member or hand crank. These prior art type parking brake systems are quite well known in the railway braking art and, therefore, a further more detailed description of them here in order to fully appreciate the advantages gained by the present invention is believed to be unnecessary.

It is further well known in the railway industry that these parking brakes are a highly critical component with respect to the safe operation of a freight car. Therefore, it is critical that they be maintained in very good working condition at all times.

Recently, the Association of American Railroads (AAR) made a specific request, to all of the manufacturers of such railway freight car parking brake systems, to submit to them any new proposals they might generate for improving such parking brake systems. Such request by the AAR was instrumental in leading to the development of the present invention.

SUMMARY OF THE INVENTION

The present invention, according to a first aspect thereof, provides a reliable and improved pneumatic pressure actuated and hydraulically applied railway freight car type parking brake system. This parking brake system includes a source of pneumatic pressure disposed on such freight car. Such source of such pneumatic pressure must be capable of supplying a predetermined volume of air pressure which is at least sufficient to actuated such parking brake system into a brake application position. A control valve means is disposed in fluid communication with this source of pneumatic pressure and is engageable on such freight car in a position to receive the air pressure from such source of pneumatic pressure. This control valve initiates a controlled communication of air pressure within such parking brake system.

A pneumatic pressure to hydraulic pressure intensifier means is disposed in fluid communication with the source of pneumatic pressure. The pneumatic pressure to hydraulic pressure intensifier means is engageable on such freight car in a position to receive such air pressure from the control valve means. This air pressure is communicated to such intensifier means at least closely adjacent a closed first end of a first chamber disposed therein. A second chamber disposed in the intensifier means is connected at an open first end thereof with a radially opposed and partially open second end of such first chamber. There is a predetermined volume of hydraulic fluid disposed in such second chamber adjacent a closed second end thereof. This brake system also includes a force transmitting cylinder means disposed on a truck portion of such freight car. Such force transmitting cylinder means is connected in fluid communication with such second chamber of the intensifier means for exerting a predetermined force on an at least one brake beam carrying a pair of brake shoes thereon. These brake shoes are brought into and maintained in frictional engagement with a predetermined portion of a respective surface of a tread portion of a pair of wheels during an application of such parking brake. A piston member is disposed for reciprocal movement within such first chamber of the intensifier means. Such piston member being linearly displaced when a first surface of such piston member, disposed facing said closed first end of said first chamber, is acted on by the air pressure being communicated to such intensifier means during an application of such parking brake. A first sealing means is disposed around a peripheral portion of the piston member for containing the air pressure being communicated to the intensifier means, during such application of the parking brake, within that portion of the first chamber located between such first surface of the piston member and the closed first end of such first chamber. A stem member is connected at a first end thereof to a radially opposed second surface of such piston member. This stem member is disposed for reciprocal movement within both the first chamber and the second chamber. This stem member is linearly displaced within both such first chamber and such second chamber by movement of the piston member. There is a second sealing means disposed around a peripheral portion of the stem member closely adjacent an axially opposed second end thereof. This second sealing means retains the hydraulic fluid disposed in such second chamber within that portion of the second chamber located between the second end of such stem member and the closed second end of such second chamber thereby enabling communication of the hydraulic fluid to the force transmitting cylinder means. This occurs by linear displacement of such stem member whereby such predetermined force is exerted on such at least one brake beam carrying such pair of brake shoes thereon which are brought into and maintained in frictional engagement with a predetermined portion of a respective surface of a tread portion of a pair of wheels during an application of such parking brake.

In a second embodiment, the present invention provides a hydraulically applied railway type freight car parking brake system. According to this second embodiment such parking brake system includes a source of hydraulic pressure disposed on such freight car for supplying a predetermined fluid pressure which is at least sufficient to actuated and maintain said parking brake system in a brake application position. There is a brake application means connected to such source of hydraulic pressure for communicating such hydraulic pressure to a force transmitting cylinder means disposed on a truck portion of such freight car and connected in fluid communication with such source of hydraulic pressure. Such force transmitting cylinder means exerting a predetermined force on an at least one brake beam carrying a pair of brake shoes thereon which are brought into and maintained in frictional engagement with a portion of a respective surface of a tread portion of a pair of wheels during an application of said parking brake.

OBJECTS OF THE INVENTION

It is, therefore, one of the primary objects of the present invention to provide a pneumatic pressure operated parking brake for a railway vehicle parking brake system which does not require either a hand wheel member or a hand crank member to be utilized in order to apply and/or release such parking brake system.

Another object of the present invention is to provide a pneumatic pressure operated parking brake for a railway vehicle parking brake system which, in addition to being effectively utilized in new railway vehicle type construction, can be readily and easily retrofitted onto the existing railway type freight cars to provide an enhanced performance of such parking brake system.

Still another object of the present invention is to provide a pneumatic pressure operated parking brake for a railway vehicle parking brake system which can effectively incorporate the use of both pneumatic and hydraulic pressure therein.

Yet another object of the present invention is to provide a pneumatic pressure operated parking brake for a railway vehicle parking brake system which can be specifically designed to be applied and/or released from either side or both sides of such railway vehicle.

A further object of the present invention is to provide a pneumatic pressure operated parking brake for a railway vehicle parking brake system which can be easily adapted for use with the numerous different style brake beams which are being used to carry the brake shoes, at the present time, in such railway vehicle type brake systems.

It is still an additional object of the present invention to provide a pneumatic pressure operated parking brake for a railway vehicle parking brake system which can be applied with fluid pressure in a first direction and released by a spring in an axially opposed second direction.

Another object of the present invention is to provide a pneumatic pressure operated parking brake for a railway vehicle parking brake system which may include at least one fail safe type feature therein.

Still yet another object of the present invention is to provide a pneumatic pressure operated parking brake for a railway vehicle parking brake system which will not cause any type detrimental interference with the required normal operation of such railway vehicle's primary air brake system when such parking brake system is not in use.

Yet still another object of the present invention is to provide a pneumatic pressure operated parking brake for a railway vehicle parking brake system which can be operated from either the ground level, from the vehicle itself, or from both the ground level and the vehicle itself.

It is a still further object of the present invention to provide a pneumatic pressure operated parking brake for a railway vehicle parking brake system which is relatively simple to operate.

A further object of the present invention is to provide a pneumatic pressure operated parking brake for a railway vehicle parking brake system which is relatively simple to install.

In addition to the several objects and advantages of the present invention that have been discussed in some detail above, various additional objects and advantages of the pneumatic pressure operated parking brake for a railway vehicle brake system, according to the present invention, will become more readily apparent to those persons who are skilled in the railway vehicle braking art from the following more detailed description of the invention, particularly, when such detailed description is taken in conjunction with the attached drawing Figures and with the appended claims.

Figure 1:
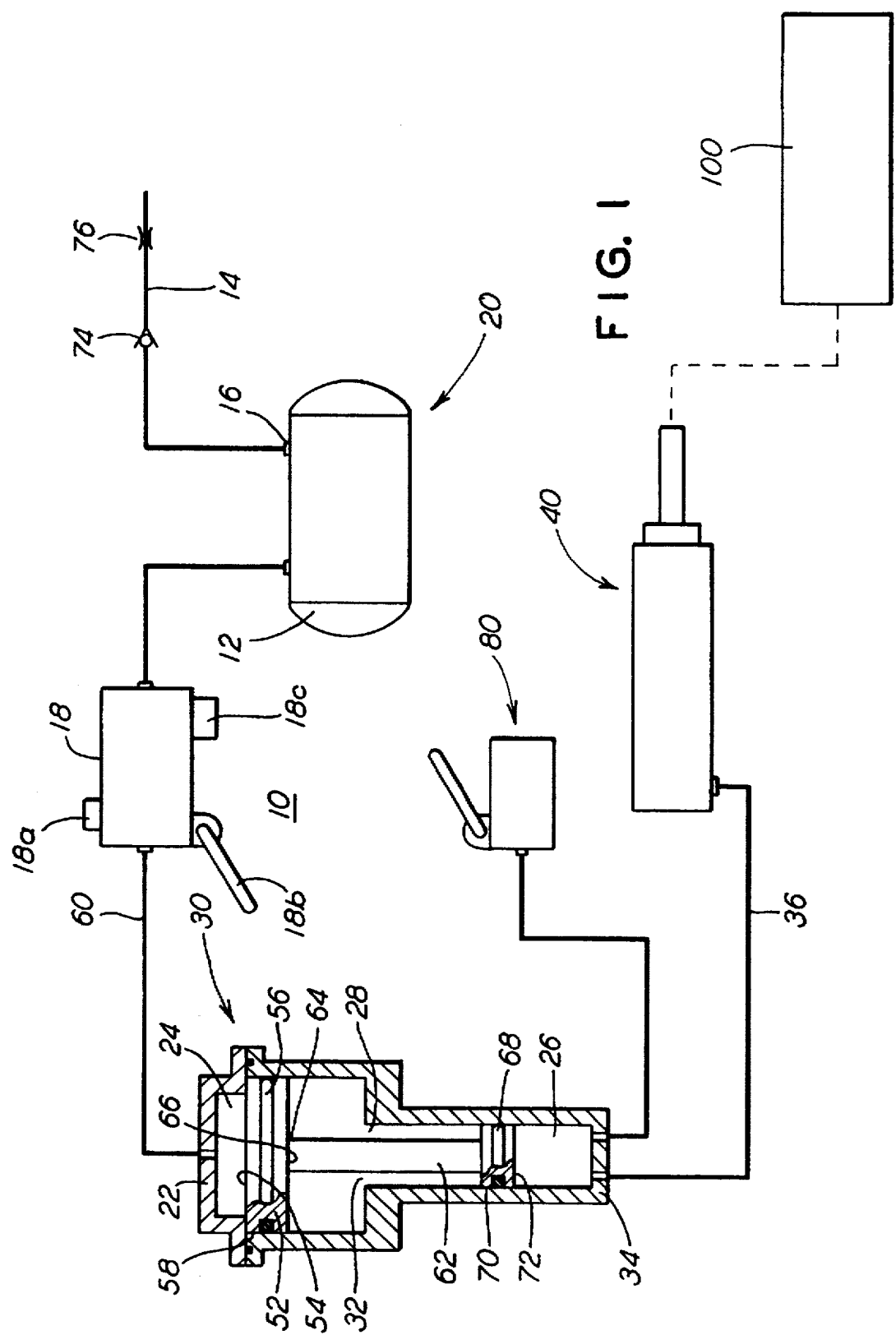
FIG. 1 is a schematic illustration of a presently preferred embodiment of a pneumatic pressure operated parking brake for a railway vehicle brake system in accordance with the present invention.

BRIEF DESCRIPTION OF THE PRESENTLY PREFERRED AND VARIOUS ALTERNATIVE EMBODIMENTS OF THE INVENTION

Prior to proceeding to the more detailed description of the instant invention, it should be noted that, for the sake of clarity and understanding of the invention, identical components which have identical functions have been identified with identical reference numerals throughout the different views which are illustrated in each of the attached drawing Figures.

Reference is now made, more particularly, to FIG. 1 of the attached drawings. Illustrated therein is a presently preferred embodiment of the pneumatic pressure operated parking brake system, generally designated 10, for a railway vehicle brake system (not shown). More specifically, this parking brake system 10 is a pneumatic pressure actuated and hydraulically applied railway type freight car parking brake system.

Such parking brake system 10 includes a source of pneumatic pressure, generally designated 20, disposed on such freight car (not shown) for supplying a predetermined volume of air pressure. This predetermined volume of air pressure must be at least sufficient to actuate the parking brake system 10 into a brake application position.

In the presently preferred embodiment of the invention, such source of pneumatic pressure 20 is an air reservoir 12. The air reservoir 12 is connected to receive compressed air from the brake pipe 14 disposed on such freight car at an input side 16 thereof.

There is a control valve means 18 disposed in fluid communication with the source of pneumatic pressure 20. Control valve means 18 is engageable on and secured to such freight car in a position to receive such air pressure from the source of pneumatic pressure 20 for initiating controlled communication of such air pressure in the parking brake system 10.

Such control valve means 18 for use in the parking brake system 10 of this invention can be one of an electrically operated control valve, a manually operated control valve and an electrically operated control valve equipped with a manual backup capability.

In an embodiment of the invention where such control valve means 18 is an electrically operated control valve, it is presently preferred that such control valve means 18 includes a push button means 18a for initiating the operation of such control valve means 18.

On the other hand, when such control valve means 18 is a manually operated control valve, the presently preferred means of initiating the operation of such control valve means 18 is a lever type mechanism 18b.

In certain applications of such parking brake system 10, according to the invention, such control valve means 18 can be an electrically operated type control valve means 18 having a manual override means 18c for initiating the operation of such parking brake system 10 in the event of a power loss on such freight car.

According to the present invention, such parking brake system 10 includes a pneumatic pressure to hydraulic pressure intensifier means, generally designated 30. Such intensifier means 30 is disposed in fluid communication with the source of such pneumatic pressure 20 and is engageable on and secured to such freight car in a position for receiving air pressure from such control valve means 18. Such air pressure is communicated to such intensifier means 30 closely adjacent the closed first end 22 of a first chamber 24 disposed within such intensifier means 30.

A second chamber 26 is disposed within such intensifier means 30. This second chamber 26 is connected at an open first end 28 thereof to communicate with a radially opposed and partially open second end 32 of such first chamber 24.

There is a predetermined volume of hydraulic fluid disposed in such second chamber 26 adjacent a closed second end 34 thereof.

According to the presently preferred embodiment of the invention, such first chamber 24 and such second chamber 26 will exhibit an elongated cylindrical shape. A diameter of such first chamber 24 is substantially larger than the diameter of such second chamber 26.

The parking brake system 10 includes a force transmitting cylinder means, generally designated 40. Such force transmitting cylinder means 40 is disposed on a truck portion (not shown) of such freight car and is connected in fluid communication, via line 36, with such second chamber 26 of the intensifier means 30. The force transmitting cylinder means 40 exerts a predetermined force on an at least one brake beam carrying a pair of brake shoes thereon which are brought into and maintained in frictional engagement with at least a portion of a respective surface of a tread portion of a pair of wheels during an application of the parking brake system 10. As the structure and interrelationship of brake beams, brake shoes, railcar wheels and their tread portions are well known in the railroad industry, these features are represented graphically in FIG. 1 as mechanical linkage 100.

Figure 2:
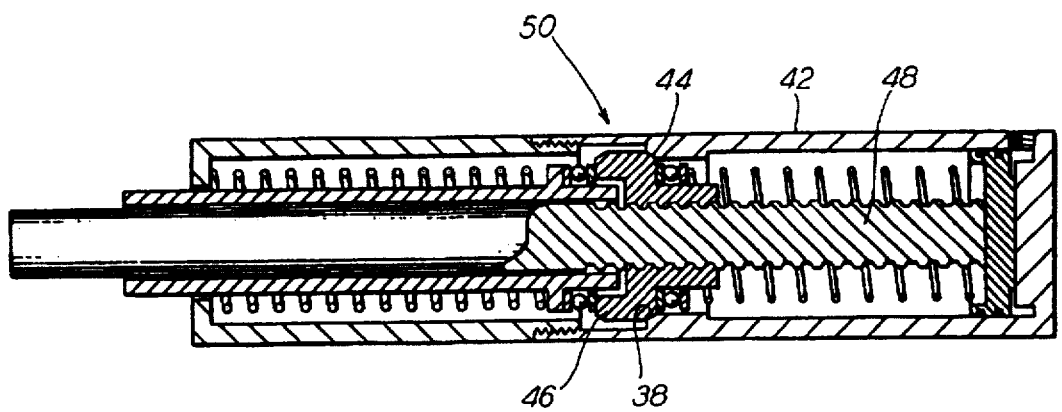
FIG. 2 is a cross sectional view of a presently preferred force transmitting cylinder means for use in such pneumatic pressure operated parking brake for a railway vehicle brake system.
Figure 3:
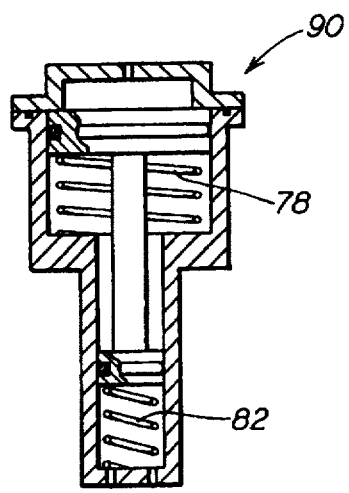
FIG. 3 is a side view of a presently preferred retraction means for use in a pneumatic pressure to hydraulic pressure intensifier means produced according to the present invention.

In the presently preferred embodiment of the parking brake system 10, as best seen in FIG. 2, such force transmitting cylinder means 40 will include a locking means, generally designated 50, for holding a brake force in such parking brake system 10 in the undesirable event of the hydraulic pressure bleeding off.

Such locking means 50 is formed by a first clutch surface 38 carried by the housing member 42 and a second clutch surface 44 carried by a threaded nut member 46 threadedly engaged with a threaded rod-like member 48. By virtue of the fact that such threaded nut member 46 causes the threaded rod-like member 48 to be extended out of such force transmitting cylinder means 40 such locking means 50 will enable adjusting for any slack which may be present in such parking brake system 10. As is well known in the railway braking art, such slack results from a number of reasons. Such reasons, for example, will at least include frictional wear of the brake shoes and of the various linkages in the freight car brake system.

A piston member 52 is disposed for reciprocal movement within such first chamber 24 of the intensifier means 30. Such piston member 52 is positioned such that it will be linearly displaced when a first surface 54 of the piston member 52 is acted on by the air pressure that is being communicated to such intensifier means 30 during an application of such parking brake system 10. The first surface 54 of such piston member 52 is disposed facing such closed first end 22 of the first chamber 24.

There is a first sealing means 56, such as an O-ring, disposed around a peripheral portion 58 of such piston member 52. The first sealing means 56 ensures that the air pressure being communicated to such intensifier means 30, via line 60, during an application of the parking brake system 10 is contained within that portion of the first chamber 24 located between such first surface 54 of the piston member 52 and such closed first end 22 of the first chamber 24.

A stem member 62 is connected at a first end 64 thereof to a radially opposed second surface 66 of such piston member 52. The stem member 62 is disposed for reciprocal movement within both the first chamber 24 and the second chamber 26. As is evident such stem member 62 will be linearly displaced within both such first chamber 24 and such second chamber 26 by the movement of such piston member 52.

The final essential component of the parking brake system 10 is a second sealing means 68, such as an O-ring. Such second sealing means 68 is disposed around a peripheral portion 70 of such stem member 62 closely adjacent an axially opposed second end 72 thereof. This second sealing means 68 ensures retention of such hydraulic fluid disposed in such second chamber 26 within that portion of the second chamber 26 located between such second end 72 of the stem member 62 and such closed second end 54 of the second chamber 26 thereby enabling communication of such hydraulic fluid, via the line 36, to such force transmitting cylinder means 40. Such communication of the hydraulic fluid occurring by the linear displacement of such stem member 62. This hydraulic fluid, communicated to the force transmitting cylinder means 40, causes such predetermined force to be exerted on such at least one brake beam carrying such pair of brake shoes thereon which are brought into and maintained in frictional engagement with a portion of a respective surface of a tread portion of a pair of wheels during an application of such parking brake system 10.

The pneumatic pressure actuated and hydraulically applied railway freight car parking brake system 10, according to a presently preferred embodiment of the invention, will further include a one way check valve means 74 disposed in brake pipe 14. Such check valve means 74 will permit the compressed air to be communicated to the air reservoir 12 and will further prevent such compressed air from returning to such brake pipe 14 from such air reservoir 12.

Additionally, in this presently preferred embodiment, such parking brake system 10 will further include a choke means 76. Such choke means 76 is disposed in such brake pipe 14 ahead of such check valve means 74. Choke means 76 provides a preferred way of controlling the flow of such compressed air to such air reservoir 12 in a relatively slow charge manner.

Also, it is presently preferred that such pneumatic pressure actuated and hydraulically applied railway freight car parking brake system 10 will further include an auxiliary type brake application means, generally designated 80. Such auxiliary type brake application means 80 is connected to such second chamber 26 in the intensifier means 30 closely adjacent the closed second end 34 thereof. This auxiliary type brake application means 80 will enable the application of such parking brake system 10 to occur even in the event there is an undesirable absence of air pressure in such source of pneumatic pressure 20, or such air reservoir 12.

In the most simple form, such auxiliary type brake application means 80 can be a fluid pressure type pump. Such fluid pressure type pump may be, for example, an electric motor driven pump (not shown), a manually operated type pump or a pump that is designed to have the capability of being operated both electrically and manually. In the presently preferred embodiment of the invention, such fluid pressure type pump is a manually operated type hand pump.

In the pneumatic pressure actuated and hydraulically applied railway freight car parking brake system 10, according to the presently preferred embodiment of the invention, such pneumatic pressure to hydraulic pressure intensifier means 30 will further include a retraction means, generally designated 90. Such retraction means 90 is disposed in one of such first chamber 24 and such second chamber 26 in a position to enhance retraction of the piston member 52 and such stem member 62 toward the closed first end 22 of such first chamber 24 located in such intensifier means 30 upon the release of such parking brake system 10.

According to the presently preferred embodiment of the instant invention, such retraction means 90 will include at least one of a spring member 78, caged between the second surface 66 of such piston member 52 and such partially open second end 32 of the first chamber 24 disposed in such intensifier means 30, and a spring member 82, caged between such second end 72 of the stem member 62 and such closed second end 34 of the second chamber 26, in order to assist in the retraction of such piston member 52 toward such closed first end 22 of such first chamber 24 in the intensifier means 30 upon the release of such parking brake system 10. In the most preferred embodiment, such retraction means 90 is the spring member 78 caged between such second surface 66 of such piston member 52 and the partially open second end 32 of such first chamber 24 disposed in such intensifier means 30.

In a second embodiment of the present invention, there is provided a hydraulically applied railway type freight car parking brake system. This parking brake system includes a source of hydraulic pressure disposed on such freight car for supplying a predetermined fluid pressure which is at least sufficient to actuate and maintain such parking brake system in a brake application position.

Such source of fluid pressure may be, for example, the hydraulic fluid that is disposed in the second chamber 26 of the intensifier means 30, and/or a separate reservoir (not shown) for containing therein a predetermined volume of such hydraulic fluid.

A brake application means, such as the auxiliary brake application means 80 discussed above with respect to the first embodiment is provided. This brake application means is connected to such source of hydraulic pressure for communicating such hydraulic fluid.

In the most simple form, such auxiliary type brake application means 80 can be a fluid pressure type pump. Such fluid pressure type pump may be, for example, an electric motor driven pump (not shown), a manually operated type pump or a pump that is designed to have the capability of being operated both electrically and manually. In the presently preferred embodiment of the invention, such fluid pressure type pump is a manually operated type hand pump.

Like the first embodiment of the invention, there is a force transmitting cylinder means 40 disposed on the truck portion of such freight car which is connected in fluid communication with such source of hydraulic pressure for exerting a predetermined force on an at least one brake beam carrying a pair of brake shoes thereon which are brought into and maintained in frictional engagement with a portion of a respective surface of a tread portion of a pair of wheels during an application of said parking brake.

In the presently preferred alternative embodiment of the parking brake system, as best seen in FIG. 2, such force transmitting cylinder means 40 will include a locking means, generally designated 50, for holding a brake force in such parking brake system 10 in the undesirable event of the hydraulic pressure bleeding off.

Such locking means 50 is formed by a first clutch surface 38 carried by the housing member 42 and a second clutch surface 44 carried by a threaded nut member 46 threadedly engaged with a threaded rod-like member 48. By virtue of the fact that such threaded nut member 46 causes the threaded rod-like member 48 to be extended out of such force transmitting cylinder means 40 such locking means 50 will enable adjusting for any slack which may be present in such parking brake system. As is well known in the railway braking art, such slack results from a number of reasons.

Such reasons, for example, will at least include frictional wear of the brake shoes and of the various linkages in the freight car brake system.

Finally, it is within the spirit of the present invention and the scope of the claims directed thereto for such force transmitting cylinder means 40 to be a simple hydraulic type cylinder.

While a presently preferred and a number of alternative embodiments of the present invention have been described in detail above, it should be understood that various additional adaptations and/or modifications to such invention can be made, particularly, by those persons who are skilled in the railway vehicle type braking systems art without departing from either the spirit of the instant invention or the scope of the appended claims.

We claim:

1. A pneumatic pressure actuated and hydraulically applied railway type freight car parking brake system, said parking brake system comprising:

(a) a source of pneumatic pressure disposed on such freight car for supplying a predetermined volume of air pressure which is at least sufficient to actuate said parking brake system into a brake application position;

(b) a control valve means disposed in fluid communication with said source of said pneumatic pressure and engageable on such freight car in a position to receive said air pressure from said source of said pneumatic pressure for initiating controlled communication of said air pressure in said parking brake system;

(c) a pneumatic pressure to hydraulic pressure intensifier means disposed in fluid communication with said source of said pneumatic pressure and engageable on such freight car in a position for receiving said air pressure from said control valve means, said air pressure being communicated to said intensifier means closely adjacent a closed first end of a first chamber disposed therein;

(d) a second chamber disposed in said intensifier means and connected at an open first end thereof with a radially opposed and partially open second end of said first chamber;

(e) a predetermined volume of hydraulic fluid disposed in said second chamber adjacent a closed second end thereof;

(f) a force transmitting cylinder means disposed on a truck portion of such freight car and connected in fluid communication with said second chamber of said intensifier means;

(g) a piston member disposed for reciprocal movement within said first chamber of said intensifier means, said piston member being linearly displaced when a first surface of said piston member, disposed facing said closed first end of said first chamber, is acted on by said air pressure being communicated to said intensifier means during an application of said parking brake;

(h) a first sealing means disposed around a peripheral portion of said piston member for containing said air pressure being communicated to said intensifier means during said application of said parking brake within that portion of said first chamber located between said first surface of said piston member and said closed first end of said first chamber;

(i) a stem member connected at a first end thereof to a radially opposed second surface of said piston member, said stem member disposed for reciprocal movement within both said first chamber and said second chamber, said stem member being linearly displaced within both said first chamber and said second chamber by movement of said piston member thereby driving said hydraulic fluid in said second chamber to said force transmitting means;

(j) a second sealing means disposed around a peripheral portion of said stem member closely adjacent an axially opposed second end thereof for retaining said hydraulic fluid disposed in said second chamber within that portion of said second chamber located between said second end of said stem member and said closed second end of said second chamber thereby enabling communication of said hydraulic fluid to said force transmitting cylinder means by said linear displacement of said stem member whereby said force transmitting cylinder means exerts a predetermined force on at least one brake beam carrying a pair of brake shoes thereon which are brought into and maintained in frictional engagement with a portion of a respective surface of a tread portion of a pair of wheels during said application of said parking brake;

(k) a pump type auxiliary brake application means connected to said second chamber in said intensifier means closely adjacent said closed second end thereof for enabling said force transmitting cylinder means to so apply said parking brake even in absence of air pressure in said source of pneumatic pressure; and (j) a simplified locking means in said force transmitting cylinder means, adjustable to accommodate slack in said parking brake system, for holding said parking brake in said application position in event of hydraulic pressure bleeding off.

2. A pneumatic pressure actuated and hydraulically applied railway freight car parking brake system, according to claim 1, wherein said source of pneumatic pressure is an air reservoir which receives compressed air from a brake pipe disposed on such car at an input side thereof.

3. A pneumatic pressure actuated and hydraulically applied railway freight car parking brake system, according to claim 2, wherein said parking brake system further includes a one way check valve means disposed in such brake pipe for allowing compressed air to be communicated to said reservoir and for preventing such compressed air from returning to such brake pipe from said air reservoir.

4. A pneumatic pressure actuated and hydraulically applied railway freight car parking brake system, according to claim 3, wherein said parking brake system further includes a choke means disposed in such brake pipe ahead of said check valve means for controlling flow of said compressed air to said air reservoir.

5. A pneumatic pressure actuated and hydraulically applied railway freight car parking brake system, according to claim 1, wherein said control valve means is one of electrically operated, manually operated and electrically operated with a manual backup capability.

6. A pneumatic pressure actuated and hydraulically applied railway freight car parking brake system, according to claim 5, wherein said control valve means is electrically operated and includes a push button means for initiating operation of said control valve means.

7. A pneumatic pressure actuated and hydraulically applied railway freight car parking brake system, according to claim 5, wherein said control valve means is manually operated by a lever mechanism.

8. A pneumatic pressure actuated and hydraulically applied railway freight car parking brake system, according to claim 5, wherein said control valve means is an electrically operated control valve means having a manual override means for operating said parking brake system in event of a power loss.

9. A pneumatic pressure actuated and hydraulically applied railway freight car parking brake system, according to claim 1, wherein said pump type auxiliary brake application means is an electric motor driven pump.

10. A pneumatic pressure actuated and hydraulically applied railway freight car parking brake system, according to claim 1, wherein said pump type auxiliary brake application means is a manually operated pump.

11. A pneumatic pressure actuated and hydraulically applied railway freight car parking brake system, according to claim 1, wherein said pump type auxiliary brake application means is a pump capable of being operated both electrically and manually.

12. A pneumatic pressure actuated and hydraulically applied railway freight car parking brake system, according to claim 1, wherein said pneumatic pressure to hydraulic pressure intensifier means further includes a retraction means disposed in one of said first chamber and said second chamber for retracting said piston member and said stem member toward said closed first end of said first chamber in said intensifier means upon release of said parking brake system.

13. A pneumatic pressure actuated and hydraulically applied railway freight car parking brake system, according to claim 12, wherein said retraction means includes at least one of a spring member caged between said second surface of said piston member and said partially open second end of said first chamber disposed in said intensifier means and a spring member caged between said second end of said stem member and said closed second end of said second chamber for retracting said piston member toward said closed first end of said first chamber in said intensifier means upon release of said parking brake system.

14. A pneumatic pressure actuated and hydraulically applied railway freight car parking brake system, according to claim 13, wherein said retraction means is a spring caged between said second surface of said piston member and said partially open second end of said first chamber disposed in said intensifier means.

* * * * *